United States Patent
Ke et al.

(10) Patent No.: US 10,432,385 B2
(45) Date of Patent: Oct. 1, 2019

(54) METHOD AND USER EQUIPMENT FOR IMPLEMENTING DEVICE TO DEVICE COMMUNICATIONS BETWEEN UES

(71) Applicant: Samsung Electronics Co., Ltd., Suwon-si, Gyeonggi-do (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/773,541

(22) PCT Filed: Mar. 21, 2014

(86) PCT No.: PCT/KR2014/002393
§ 371 (c)(1),
(2) Date: Sep. 8, 2015

(87) PCT Pub. No.: WO2014/148859
PCT Pub. Date: Sep. 25, 2014

(65) Prior Publication Data
US 2016/0029423 A1    Jan. 28, 2016

(30) Foreign Application Priority Data
Mar. 21, 2013   (CN) .......................... 2013 1 0092289

(51) Int. Cl.
*H04L 5/14*     (2006.01)
*H04W 8/18*    (2009.01)
(Continued)

(52) U.S. Cl.
CPC ................ *H04L 5/14* (2013.01); *H04W 8/18* (2013.01); *H04W 8/186* (2013.01);
(Continued)

(58) Field of Classification Search
None
See application file for complete search history.

(56) References Cited

U.S. PATENT DOCUMENTS 9,288,793 B2     3/2016  Wang et al.
2006/0160544 A1  7/2006  Sun et al.
(Continued)

FOREIGN PATENT DOCUMENTS

CN    1527621 A     9/2004
CN    102711105 A   10/2012
(Continued)

OTHER PUBLICATIONS

ZTE, Clarification on ProSe authorized indication in the S1 interface, SA WG2 Meeting #102, S2-141167, Mar. 18, 2014, XP050835665, St. Julian's, Malta.
(Continued)

*Primary Examiner* — Mohammad S Adhami
(74) *Attorney, Agent, or Firm* — Jefferson IP Law, LLP

(57) ABSTRACT

The present application provides a method for implementing a device to device (D2D) communication between UEs, wherein a UE and a network obtain each other's capability of Proximity Service (ProSe); the UE may activate the capability of ProSe that both the UE and the network support and initiates a request for a ProSe service with another UE to the network; the network authenticates the request for the ProSe service according to subscription information for the UE's device to device communication; and the network establishes a device to device PDN bearer between the two UEs for the request for the ProSe service passing the authentication. The present application further provides a user equipment. The present application is the basis for implementing the ProSe, the application thereof can satisfy (Continued)

service demands of public safety communication and realize network resource optimization configuration.

6 Claims, 14 Drawing Sheets

(51) Int. Cl.
*H04W 72/04* (2009.01)
*H04W 72/08* (2009.01)
*H04W 76/14* (2018.01)
*H04W 8/00* (2009.01)

(52) U.S. Cl.
CPC ....... *H04W 72/048* (2013.01); *H04W 72/085* (2013.01); *H04W 76/14* (2018.02); *H04W 8/005* (2013.01)

(56) References Cited

U.S. PATENT DOCUMENTS

| | | | |
|---|---|---|---|
| 2010/0009675 A1 | 1/2010 | Wijting et al. | |
| 2011/0258313 A1 | 10/2011 | Mallik et al. | |
| 2012/0011247 A1 | 1/2012 | Mallik et al. | |
| 2012/0082091 A1 | 4/2012 | Siomina et al. | |
| 2012/0258703 A1 | 10/2012 | Hakola et al. | |
| 2013/0303088 A1* | 11/2013 | Watfa | H04W 76/14 455/41.2 |
| 2014/0192739 A1* | 7/2014 | Liao | H04W 60/04 370/329 |
| 2014/0335791 A1* | 11/2014 | Kim | H04W 4/008 455/41.2 |
| 2015/0017917 A1* | 1/2015 | Guo | H04W 4/023 455/41.2 |
| 2015/0223274 A1* | 8/2015 | Zhu | H04W 4/206 370/329 |
| 2015/0382142 A1* | 12/2015 | Kim | H04W 4/022 455/41.2 |

FOREIGN PATENT DOCUMENTS

| | | |
|---|---|---|
| CN | 102792759 A | 11/2012 |
| CN | 102857901 A | 1/2013 |

OTHER PUBLICATIONS

Qualcomm Incorporated, Resource allocation aspects of 1: M D2D broadcast communication, 3GPP TSG-RAN WG2 #85, R2-140714, Feb. 10-14, 2014, XP050792008, Prague, Czech Republic.

3rd Generation Partnership Project; Technical Specification Group Services and System Aspects; Proximity-based services (ProSe); Stage 2 (Release 12), 3GPP TS 23.303 V12.0.0, pp. 1-53, XP050769625, Mar. 10, 2014.

3rd Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401 V8.18.0, pp. 1-2, 55-62, XP002754484, Mar. 7, 2013.

Qualcomm Incorporated, Proposed solution for direct discovery and communication using E-UTRAN, SA WG2 Meeting #95, S2-130308, Feb. 1, 2013, Prague, Czech Republic.

* cited by examiner

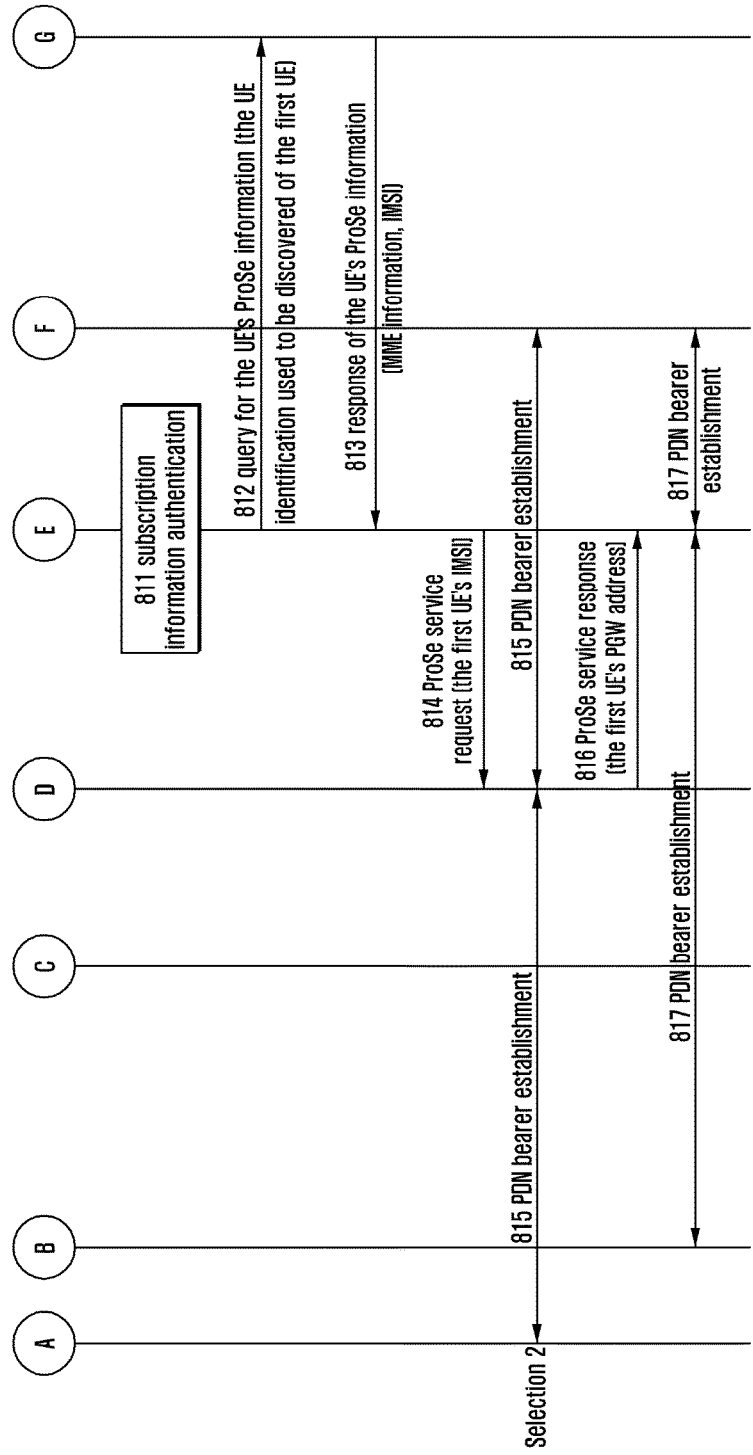

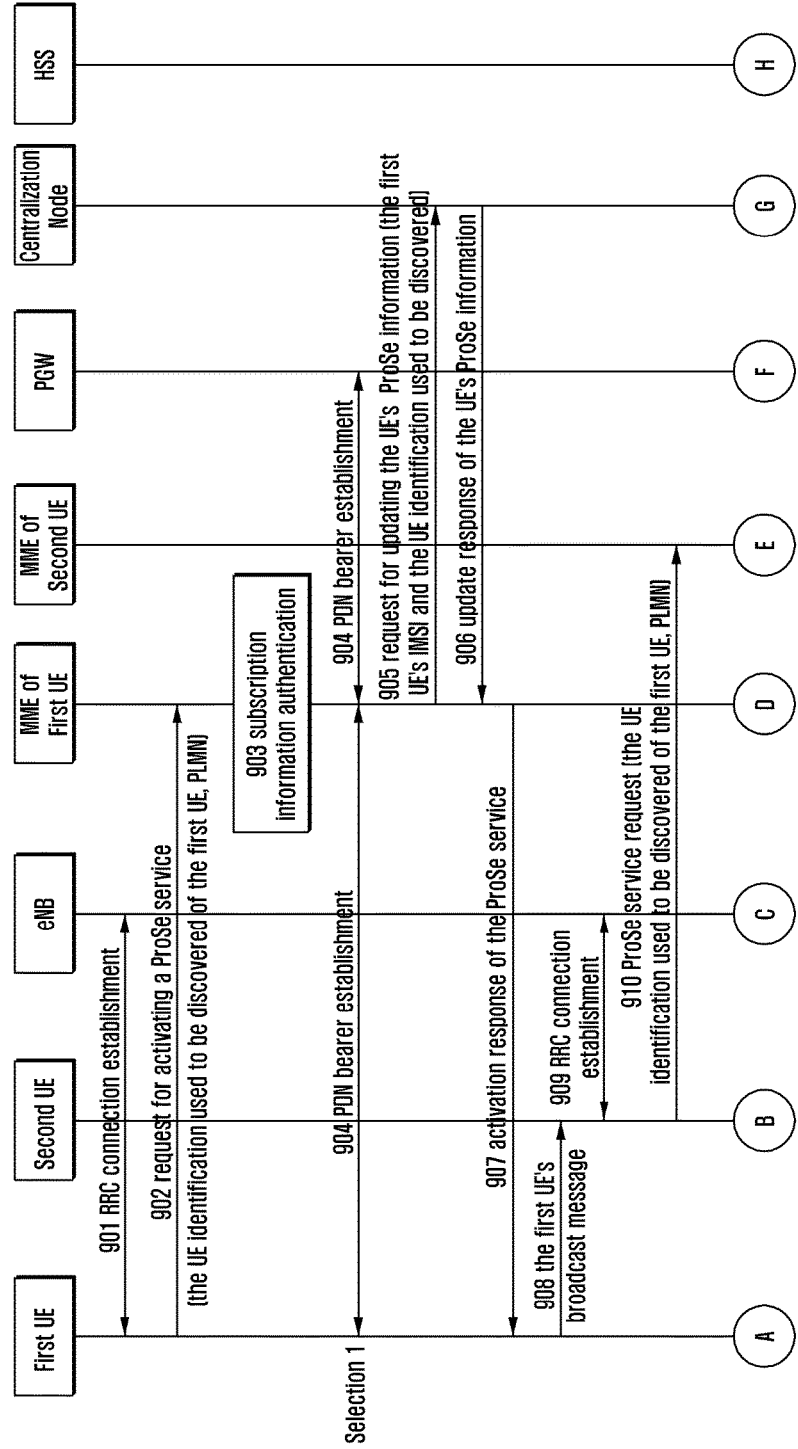

METHOD AND USER EQUIPMENT FOR IMPLEMENTING DEVICE TO DEVICE COMMUNICATIONS BETWEEN UES

TECHNICAL FIELD

This application relates to wireless communication technology, and more particularly to a method and user equipment for implementing device to device (D2D) communications between UEs.

BACKGROUND ART

The modern mobile communication increasingly tends to provide diversified services to users, and as shown in FIG. 1, it is a system architecture diagram of the existing evolved packet system (EPS). In FIG. 1, the user equipment (UE) 101 is a terminal device for receiving data. The evolved universal terrestrial radio access network (E-UTRAN) 102 is a radio access network, which comprises a macro base station (eNodeB) providing an interface for accessing a wireless network for the UE. The mobility management entity (MME) 103 is responsible for managing mobile context, session context and security information of the UE. The serving gateway (SGW) 104 provides mainly user plane functions, and the MME 103 and SGW 104 may reside in the same physical entity. The packet data network gateway (PGW) 105 may be responsible for functions such as charging, lawful interception and the like, and it may reside in the same physical entity as the SGW 104. The policy and charging rules function (PCRF) 106 provides quality of service (QoS) policies and charging criterions. The general packet radio service support node (SGSN) 108 is a network node device for providing routing for data transmission in the universal mobile telecommunication system (UMTS). The home subscriber server (HSS) 109 is a home subsystem which the UE belongs to, and is responsible for protecting subscriber information including the current location of the user equipment, the address of the serving node, subscriber security information, the packet data context of the user equipment and the like.

DISCLOSURE OF INVENTION

Technical Problem

Currently, Public Safety Department of the United States has employed the LTE network as an infrastructure communication network of the public safety communication service thereof. In the current public safety communication demands, there is a particular need for supporting a Proximity Service (ProSe) between the UEs, including a ProSe discovery and a ProSe communication for discovering a ProSe user or being discovered by the ProSe user, and supporting direct path communications between the UEs of the ProSe users or supporting the UE of the ProSe user to implement a locally routed communication over the network. In the current network release of the 3GPP, there is a lack of the definition on the support and capability of the ProSe. Thus, related problems, such as the interaction between the UE and the network capability, the authentication of the subscription information, the one-to-one communication service request and bearer establishment based on locally-routed and the like, are not resolved in the ProSe.

Solution to Problem

The present application is directed to a method and user equipment for implementing device to device communications between UEs so as to provide a basis for the implementation of the ProSe, thus satisfying service requirements of the public safety communication and accomplishing optimization configurations of network resources.

The present application provides a method for implementing device to device communications between UEs, including:

a user equipment (UE) and a network obtaining each other's capability of ProSe;

a second UE initiating to the network a ProSe service request, the ProSe service request carrying a discovered UE identification that is used by a first UE, wherein the UE identification used to be discovered of the first UE is capable of uniquely identifying the first UE or a user to which the first UE corresponds; and the first UE and the second UE establishing a device to device packet data network (PDN) bearer between the UEs with the same packet data network gateway (PGW) respectively.

Preferably, a process of the first UE and the second UE establishing a device to device packet data network (PDN) bearer between the UEs with the same packet data network gateway (PGW) respectively includes:

an MME of the first UE establishing a PDN bearer of the first UE, and updating an address of the serving packet data network gateway (PGW) and the UE identification used to be discovered to a centralization node; wherein the centralization node is a DNS, an HSS, a designated MME or a separate centralization node of a ProSe; and after receiving the ProSe service request initiated by the second UE, according to the UE identification used to be discovered of the first UE carried in the ProSe service request, an MME of the second UE issuing an query for the address of the serving PGW of the first UE to the centralization node, and selecting the same PGW for the second UE to establish a PDN bearer.

Preferably, a process of the first UE and the second UE establishing a device to device packet data network (PDN) bearer between the UEs with the same packet data network gateway (PGW) respectively includes:

an MME of the first UE updating IMSI information of the first UE and the UE identification used to be discovered to a centralization node;

after receiving the ProSe service request initiated by the second UE, an MME of the second UE issuing an query for the IMSI information of the first UE to the centralization node according to the UE identification used to be discovered of the first UE carried in the ProSe service request, and issuing a query for MME information of the first UE to an HSS according to the IMSI information of the first UE; and the MME of the second UE requesting an address of the serving PGW of a ProSe service from the MME of the first UE, and selecting the same PGW for the second UE to establish a PDN bear.

Preferably, a process of the first UE and the second UE establishing a device to device packet data network (PDN) bearer between the UEs with the same packet data network gateway (PGW) respectively includes:

an MME of the first UE updating IMSI information of the first UE, MME information of the first UE and the UE identification used to be discovered to a centralization node;

when an MME of the second UE receives the ProSe service request initiated by the second UE, based on the UE identification used to be discovered of the first UE carried in the ProSe service request, the MME of the second UE issuing a query for MME information of the first UE to the centralization node; and the MME of the second UE requesting an address of the serving PGW of a ProSe service from the MME of the first UE, and selecting the same PGW for the second UE to establish a PDN bear.

Preferably, a process of the first UE and the second UE establishing a device to device packet data network (PDN) bearer between the UEs with the same packet data network gateway (PGW) respectively includes:

an MME of the first UE updating IMSI information of the first UE and the UE identification used to be discovered to a centralization node; an MME of the second UE being a PGW selected by the second UE to access communication services;

when receiving the ProSe service request initiated by the second UE, the MME of the second UE issuing an query for the IMSI information of the first UE to the centralization node according to the UE identification used to be discovered of the first UE carried in the ProSe service request, and issuing a query for MME information of the first UE to an HSS according to the IMSI information of the first UE; and the serving MME of the second UE instructing the MME of the first UE to select the same PGW as the PGW of the ProSe service for first UE and second UE.

Preferably, a process of the first UE and the second UE establishing a device to device packet data network (PDN) bearer between the UEs with the same packet data network gateway (PGW) respectively includes:

an MME of the first UE updating IMSI information of the first UE, MME information of the first UE and the UE identification used to be discovered to a centralization node; an MME of the second UE being a PGW selected by the second UE to access communication services;

when receiving the ProSe service request initiated by the second UE, the MME of the second UE issuing an query for the MME information of the first UE to the centralization node according to the UE identification used to be discovered of the first UE carried in the ProSe service request; and the serving MME of the second UE instructing the MME of the first UE to select the same PGW as the PGW of the ProSe service for first UE and second UE.

Preferably, the method further includes: after the first UE completes handover between MMEs, the target MME updating the MME information to the centralization node.

Preferably, the UE's capability of ProSe includes UE radio capability of ProSe and UE network capability of ProSe;

the network's capability of ProSe includes EPS capability of ProSe and E-UTRAN capability of ProSe.

Preferably, the UE radio capability of ProSe includes, but is not limited to, UE radio capability of ProSe discovery and UE radio capability of ProSe communication; or the UE radio capability of ProSe includes, but is not limited to, UE radio capability of ProSe discovery intra-frequency, UE radio capability of ProSe discovery inter-frequency, UE radio capability of ProSe communication intra-frequency and UE radio capability of ProSe communication inter-frequency; the UE radio capability of ProSe is sent to the network during the UE's attachment or the UE's TAU; and the UE network capability of ProSe includes UE capability of ProSe discovery and UE network capability of ProSe communication; wherein, the UE capability of ProSe discovery includes, but is not limited to, UE network capability of ProSe discovery, UE network capability of ProSe being discovered; the UE network capability of ProSe communication includes, but is not limited to, UE network capability of ProSe communication based on locally-routed, UE network capability of ProSe communication based on direct mode, UE network capability of ProSe communication based on relay; the UE network capability of ProSe is sent to the network during the UE's attachment or the UE's TAU.

Preferably, the EPS capability of ProSe includes, but is not limited to, whether or not EPS capability of ProSe discovery is supported, and whether or not EPS capability of ProSe communication is supported; the EPS capability of ProSe is sent to the UE when the UE's attachment or the UE's TAU is accepted; and the E-UTRAN capability of ProSe includes, but is not limited to, whether or not E-UTRAN capability of ProSe discovery is supported, and whether or not E-UTRAN capability of ProSe communication is supported; the E-UTRAN indicates the E-UTRAN capability of ProSe to the UE in a system information of a cell supporting the ProSe.

Preferably, the method further includes:

upon receiving the ProSe service request from the second UE, an MME of the second UE authenticating this request from the second UE according to ProSe subscription information of the second UE;

the ProSe subscription information of a UE includes, but is not limited to, the subscription information associated with ProSe discovery, the subscription information associated with ProSe being discovered, the subscription information associated with the ProSe service, wherein:

the subscription information associated with ProSe discovery includes: allowing being invoked with or without network coverage, allowing listing invoked APPs and a discovery range; the discovery range including a signal quality range or a range of geographical distances, a list of users, user groups, UEs or UE groups that is allowed to perform discovery, and a list of users, user groups, UEs or UE groups that is forbidden to perform discovery;

the subscription information associated with ProSe being discovered includes: allowing being invoked with or without network coverage, allowing listing invoked APPs, a list of users, user groups, UEs or UE groups that is allowed to be discovered, and a list of users, user groups, UEs or UE groups that is forbidden to be discovered; and the subscription information associated with the ProSe service includes: allowing being invoked with or without network coverage, and an one-to-one communication or group communication based on locally-routed, UE direct path or Relay, communication services including phone calls, data flows and short messages.

The present application provides a user equipment, wherein the user equipment includes a communication capability interaction module, a ProSe discovery module and a ProSe communication module, wherein:

the communication capability interaction module is used for acquiring a capability of ProSe of a network, and sending its capability of ProSe to the network;

the ProSe discovery module is used for discovering another user equipment according to a discovered UE identifications that is used by said another user equipment; and the ProSe communication module is used for initiating an ProSe service request to the network, the ProSe service request carrying the discovered UE identification that is used by said another user equipment, and when the authentication of the said request are passed based on subscription information, establishing a device to device inter-UE PDN bearer based on locally-routed between the user equipment and said another user equipment.

Advantageous Effects of Invention

As seen from the above, in the technique scheme provided by this application, through the authorization of the communication capabilities and the authentication of the subscription information, the one-to-one locally routed path is established for the UE, thereby achieving routing optimization and saving resource occupations, which is the foundation of deploying and developing the ProSe service, offers various communication ways for the user and enriches the user's service experience.

BRIEF DESCRIPTION OF DRAWINGS

FIGS. 8a and 8b are schematic diagrams of Embodiment 1 of Method 2 for establishing a device to device PDN bearer between the UEs in this application;

FIGS. 9a and 9b are schematic diagrams of Embodiment 2 of Method 2 for establishing a device to device PDN bearer between the UEs in this application;

MODE FOR THE INVENTION

Figure 1:
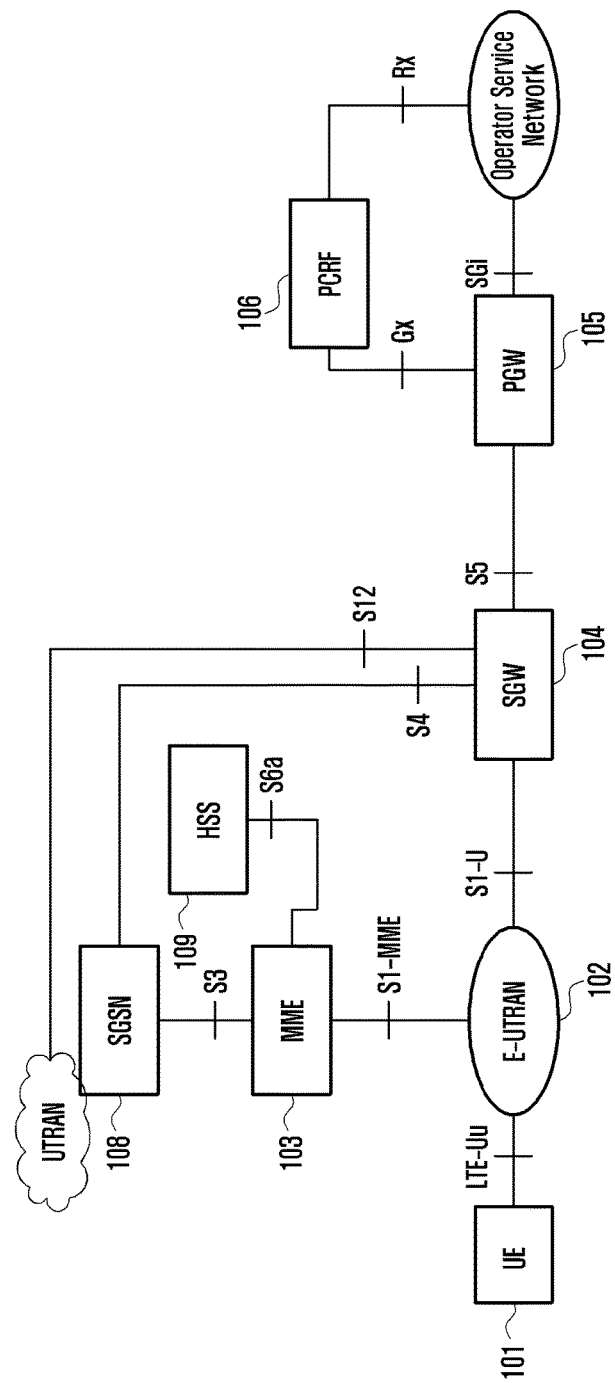
FIG. 1 is a schematic diagram of system architecture of the existing EPS.

In order that the objects, technical schemes and advantages of this application become more apparent, the application will be described in further detail below with reference to the drawing and by way of the embodiment.

Figure 2:
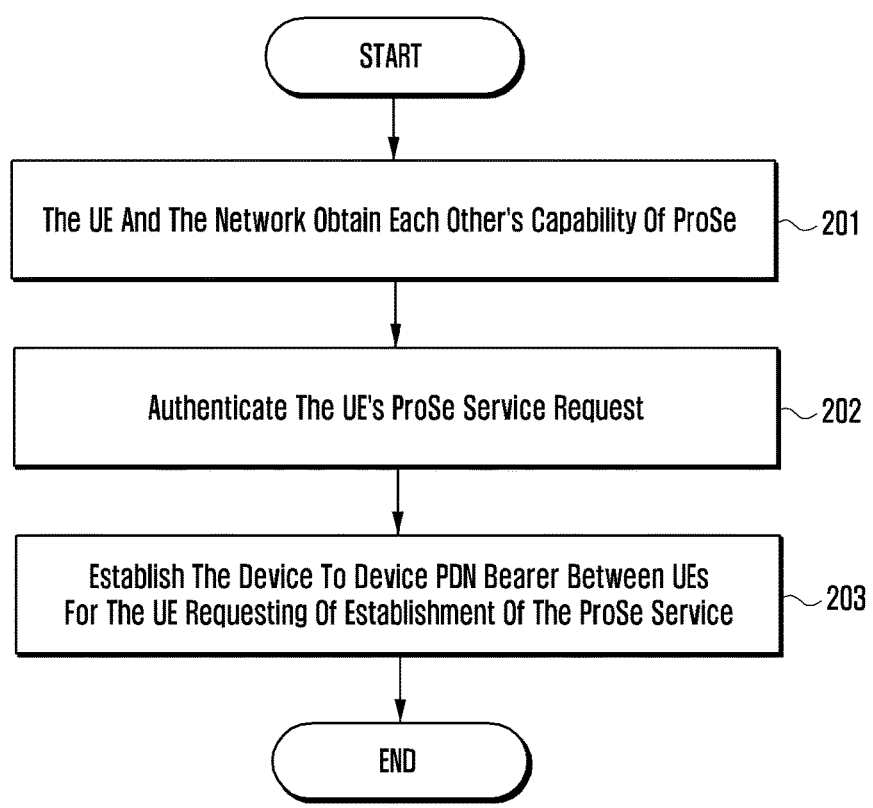
FIG. 2 is a schematic flow diagram of a method for implementing device to device communications between UEs in this application.

FIG. 2 is schematic flow diagram of a method for implementing device to device communications between UEs in this application, the method including the following steps:

Step 201: a UE and a network obtain each other's capability of Proximity Service (ProSe).

The UE and the network need to obtain mutually each other's capability of ProSe.

The UE's capability of ProSe includes UE radio capability of ProSe and UE network capability of ProSe.

The network's capability of ProSe includes EPS capability of ProSe and E-UTRAN capability of ProSe.

The UE network capability of ProSe includes UE capability of ProSe discovery and UE network capability of ProSe communication; wherein, the UE capability of ProSe discovery includes, but is not limited to, UE network capability of ProSe discovery, UE network capability of ProSe being discovered; the UE network capability of ProSe communication includes, but is not limited to, UE network capability of ProSe communication based on locally-routed, UE network capability of ProSe communication based on direct mode, UE network capability of ProSe communication based on relay; the UE network capability of ProSe is sent to the network during the UE's attachment or the UE's TAU.

The UE radio capability of ProSe includes, but is not limited to, UE radio capability of ProSe discovery and UE radio capability of ProSe communication; or the UE radio capability of ProSe further includes, but is not limited to, UE radio capability of ProSe discovery intra-frequency, UE radio capability of ProSe discovery inter-frequency, UE radio capability of ProSe communication intra-frequency and UE radio capability of ProSe communication inter-frequency; the UE radio capability of ProSe is sent to the network during the UE's attachment or the UE's TAU.

The EPS capability of ProSe includes, but is not limited to, whether or not EPS capability of ProSe discovery is supported, and whether or not EPS capability of ProSe is supported; the EPS capability of ProSe is sent to the UE when the UE's attachment or the UE's TAU is accepted.

The E-UTRAN capability of ProSe includes, but is not limited to, whether or not E-UTRAN capability of ProSe discovery is supported, and whether or not E-UTRAN capability of ProSe communication is supported; the E-UTRAN indicates the E-UTRAN capability of ProSe to the UE in a system information of a cell supporting the ProSe.

If both the network and the UE support the ProSe capability, the UE may activate the capability and initiate a request to the network, to discover UE in the proximity, or be discovered by UE in the proximity, or initiate a communication with UE in the proximity.

Step 202: the ProSe service request initiated by the UE is authenticated.

Specifically, within the ProSe service system, the first UE employs the discovered UE identification that is used by certain UE in order to be discovered, the UE identification may uniquely identify the UE or the user, the second UE may discover the first UE based on the discovered UE identification that is used by certain UE through measurement, or also may discover the first UE based on the discovered UE identification that is used by certain UE which is configured by a network manager or a network, and may initiate to the network a ProSe service request. An MME needs to authenticate the communication request of the second UE according to the subscription information of the user.

The ProSe subscription information of the UE includes but is not limited to the followings:

ProSe discovering: allowing being invoked with or without network coverage, allowing listing invoked APPs and a discovery range; the discovery range including a signal quality range or a range of geographical distances, a list of users, user groups, UEs or UE groups that is allowed to perform discovery, and a list of users, user groups, UEs or UE groups that is forbidden to perform discovery;

ProSe being discovered: allowing being invoked with or without network coverage, allowing listing invoked APPs, a list of users, user groups, UEs or UE groups that is allowed to be discovered, and a list of users, user groups, UEs or UE groups that is forbidden to be discovered; and ProSe service: allowing being invoked with or without network coverage, and an one-to-one communication or group communication based on locally-routed, UE direct path or Relay, communication services including phone calls, data flows and short messages and the like.

Step 203: a device to device PDN bearer between the UEs based on locally-routed is established, that is: the PDN bearers with the same PGW are established respectively for the two UEs requesting the ProSe service.

With respect to the ProSe service request of which the authentication is passed, the MME establishes two device to device PDN bearers respectively for the two UEs, and the two PDN bearers are established on the same PGW. The establishment procedure of the device to device PDN bearers between the UEs will be described in detail below with reference to the accompanying drawings.

Figure 3:
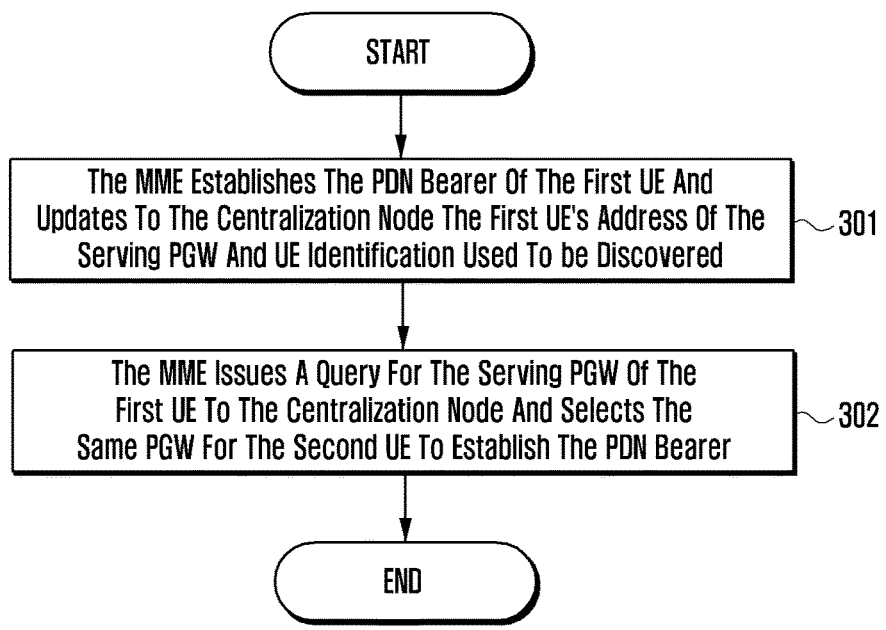
FIG. 3 is a schematic flow diagram of Method 1 for establishing a device to device PDN bearer between the UEs in this application.

FIG. 3 is a schematic flow diagram of Method 1 for establishing a device to device PDN bearer between the UEs in this application, the method including the following steps:

Step 301: an MME establishes a PDN bearer of the first UE, and updates an address of the serving PGW and the UE identification used to be discovered to a centralization node.

When the first UE activates the capability of ProSe or the capability of ProSe of the first UE is authorized, the MME selects for the first UE a PGW nearby as the serving PGW of its ProSe, and stores the address of the serving PGW and the UE identification used by the first UE for being discovered in a centralization node in the network. The address of this centralization node is preconfigured on the MME supporting the ProSe.

The centralization node may be a DNS, HSS, a certain MME or a separate centralization node of the ProSe.

Step 302: the MME issues a query for the serving PGW of the first UE to the centralization node, and selects the same PGW for the second UE to establish the PDN bearer.

When the second UE initiates a request for the ProSe service with the first UE to the network, the request carries the UE identification used to be discovered of the first UE. Based on the UE identification used to be discovered of the first UE, the MME issues a query for the address of the serving PGW which serves the first UE in the ProSe service to the centralization node, and selects the same PGW for the second UE to establish the PDN bearer.

Figure 4:
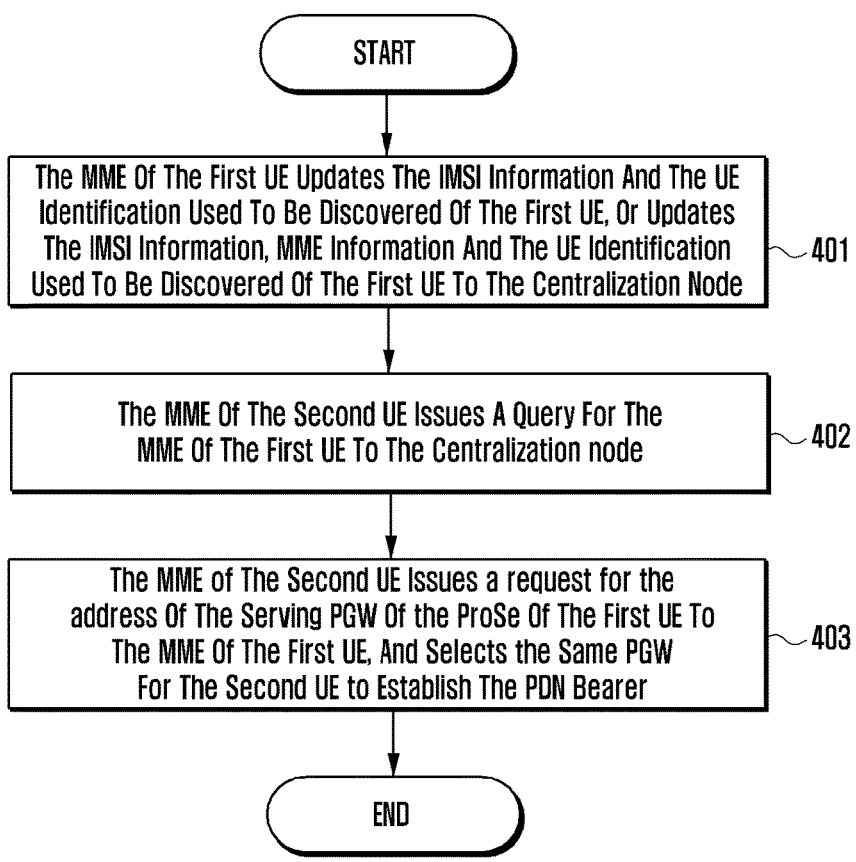
FIG. 4 is a schematic flow diagram of Method 2 for establishing a device to device PDN bearer between the UEs in this application.

FIG. 4 is a schematic flow diagram of Method 2 for establishing a device to device PDN bearer between the UEs in this application, the method including the following steps:

Step 401: the MME of the first UE updates the IMSI information and the UE identification used to be discovered of the first UE, or updates the IMSI information, MME information and the UE identification used to be discovered of the first UE to the centralization node.

When the first UE activates the capability of ProSe or the capability of ProSe of the first UE is authorized, its MME stores the IMSI information of the first UE and the UE identify used to be used of the first UE in a centralization node in the network, or stores the first UE's IMSI information, MME information and the UE identification used to be discovered in a centralization node in the network. The MME information is the identification (GUMMEI) and the address of the MME.

The centralization node may be a DNS, HSS, a certain MME or a separate centralization node of the ProSe.

With respect to the manner that MME information is updated to the centralization node, when the first UE completes handover between MMEs, the target MME updates new MME information to the centralization node.

Step 402: the MME of the second UE issues a query for the MME of the first UE to the centralization node.

When the second UE initiates a request for the ProSe service with the first UE to the network, the request carries the UE identification used to be discovered of the first UE. On the condition that in Step 401, the MME only stores the IMSI information and the UE identification used to be discovered of the first UE in the centralization node, then, in this step, at first, the MME issues a query for the IMSI of the first UE to the centralization node according to the UE identification used to be discovered of the first UE, and then issues a query for the MME information of the first UE to the HSS according to the IMSI of the UE. On the condition that in Step 401, the MME stored the IMSI information, MME information and the UE identification used to be discovered of the first UE in the centralization node, then, the target MME needs to update the MME information to the centralization node when the UE performs handover between the MMEs, and in this step, the MME may directly issues a query for the MME information of the first UE to the centralization node according to the UE identification used to be discovered of the first UE.

Step 403: the MME of the second UE issues a request for the address of the serving PGW of the ProSe of the first UE to the MME of the first UE, and selects the same PGW for the second UE to establish the PDN bearer.

After receiving communication service request transmitted by the MME of the second UE, the MME of the first UE pages the first UE, selects for the first UE a PGW nearby for establishing a PDN connection of the ProSe service, and returns the PGW's address to the MME of the second UE, and the MME of the second UE selects the same PGW for the second UE to establish the PDN bearer.

Figure 5:
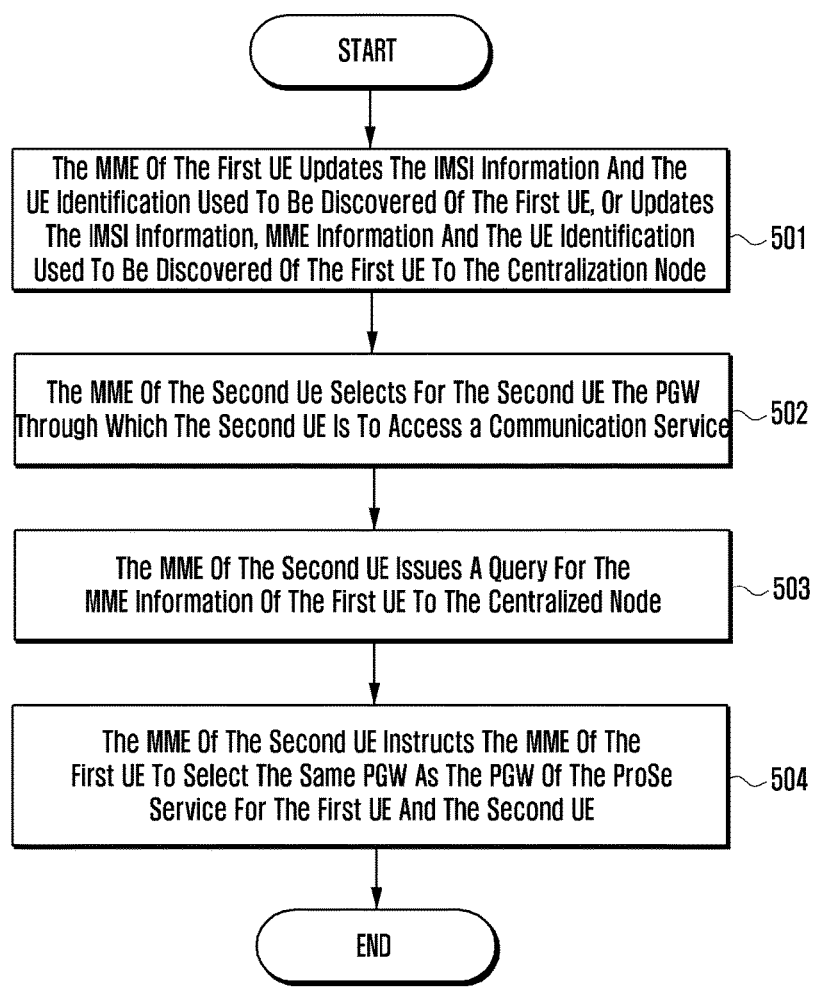
FIG. 5 is a schematic flow diagram of Method 3 for establishing a device to device PDN bearer between the UEs in this application.

FIG. 5 is a schematic flow diagram of Method 3 for establishing a device to device PDN bearer between the UEs in this application, the method including the following steps:

Step 501: the MME of the first UE updates the IMSI information and the UE identification used to be discovered of the first UE, or updates the IMSI information, MME information and the UE identification used to be discovered of the first UE to the centralization node.

When the first UE activates the capability of ProSe or the capability of ProSe of the first UE is authorized, its MME stores the IMSI information of the first UE and the UE identification used to be discovered of the first UE in a centralization node in the network, or stores the first UE's IMSI information, MME information and the UE identification used to be discovered in a centralization node in the network. The MME information is the identification (GUMMEI) and the address of the MME.

With respect to the manner in which the MME information is updated to the centralization node, the target MME updates the MME information to the centralization node when the first UE completes the handover between MMEs.

The centralization node may be a DNS, HSS, a certain MME or a separate centralization node of the ProSe.

Step 502: the MME of the second UE selects for the second UE the PGW through which the second UE is to access a communication service.

When the second UE initiates a request for the ProSe service with the first UE to the network, the MME selects the PGW through which the second UE is to access the communication service.

Step 503: the MME of the second UE issues a query for the MME information of the first UE to the centralized node.

The second UE initiates a request for the ProSe service with the first UE to the network, and the request carries the UE identification used to be discovered of the first UE. On the condition that in Step 501, the MME only stores the IMSI information and the UE identification used to be discovered of the first UE in the centralization node, then, in this step, at first, the MME issues a query for the IMSI of the first UE to the centralization node according to the UE identification used to be discovered of the first UE, and then issues a query for the MME information of the first UE to the HSS according to the IMSI of the UE. On the condition that in Step 501, the MME stored the IMSI information, MME information and the UE identification used to be discovered of the first UE in the centralization node, the target MME needs to update the MME information to the centralization node when the UE performs handover between the MMEs, and in this step, the MME may directly issue a query for the MME information of the first UE to the centralization node according to the UE identification used to be discovered of the first UE.

Step 504: the MME of the second UE instructs the MME of the first UE to select the same PGW as the PGW of the ProSe service for the first UE and the second UE.

The MME of the second UE initiates a request for the ProSe service to the MME of the first UE, and the request carries the PGW's address or indicates the storage location of the PGW's address. The MME of the first UE establishes for the first UE a PDN connection to the PGW designated in the request. After receiving a ProSe service response that the MME of the first UE returns, the MME of the second UE establishes a PDN bearer to the same PGW for the second UE.

Figure 6:
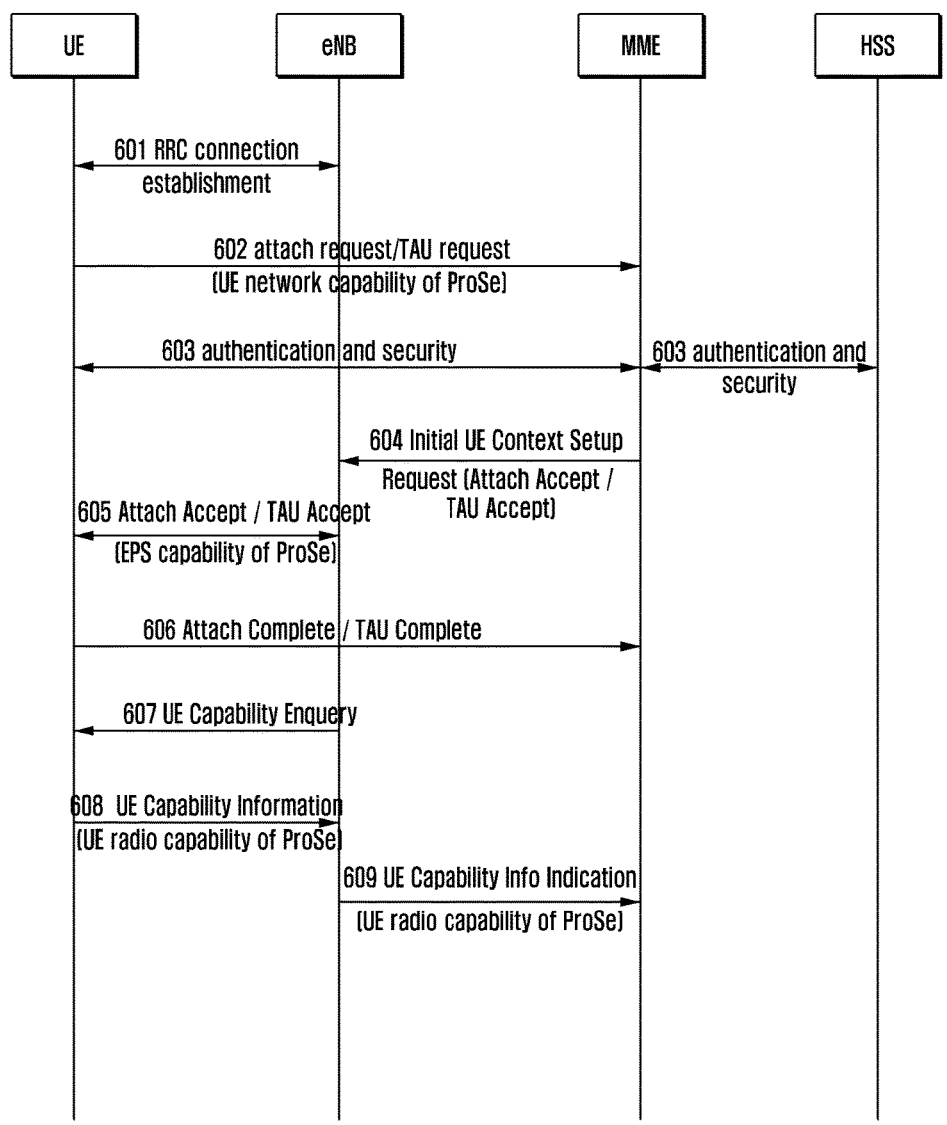
FIG. 6 is a schematic diagram of an embodiment of a method of the UE and the network obtaining each other's capability of ProSe service in this application.

FIG. 6 is a schematic diagram of an embodiment of a method of the UE and the network obtaining each other's capability of ProSe service in this application, the method including the following steps:

Step 601: a UE performs the establishment procedure of a RRC connection between the UE and the network.

Step 602: The UE sends an attach request or a TAU request to the MME, the request carrying the UE network capability of ProSe. The UE network capability of ProSe includes but is not limited to, UE capability of ProSe discovery and UE network capability of ProSe being discovered. The UE network capability of ProSe communication includes, but is not limited to, UE network capability of ProSe communication based on locally-routed, UE network capability of ProSe communication based on direct mode, UE network capability of ProSe communication based on relay.

Steps 603: the UE completes procedures of authentication and encryption between the UE and the network.

Step 604: an MME sends to an eNB an Initial UE Context Setup Request, and the request carries an Attach Accept or TAU Accept, where the Attach Accept or TAU Accept carries the EPS capability of ProSe, and the UE's radio capability parameter carried in the request is null.

Step 605: after the eNB receives Initial UE Context Setup Request, it finds that the UE's radio capability parameter is null, then triggers Step 607 to issue a query for the UE's radio capability, at the same time, transmits the Attach Accept or TAU Accept to the UE through an RRC message, where the Attach Accept or TAU Accept carries the EPS capability of ProSe which includes but is not limited to, whether or not EPS capability of ProSe discovery is supported, and whether or not EPS capability of ProSe communication is supported.

Step 606: the UE returns to the network an Accept Complete or TAU Complete.

Step 607: the eNB sends a UE Capability Enquiry to the UE for querying the radio capability that the UE supports.

Step 608: the UE returns its UE Capability Information to the eNB, including the UE radio capability of ProSe that the UE supports. The UE radio capability of ProSe includes, but is not limited to, UE radio capability of ProSe discovery and UE radio capability of ProSe communication, or includes, but not limited to, UE radio capability of ProSe discovery intra-frequency, UE radio capability of ProSe discovery inter-frequency, UE radio capability of ProSe communication intra-frequency and UE radio capability of ProSe communication inter-frequency.

Step 609: the eNB sends the obtained UE radio capability to the MME by a UE Capability Info Indication which includes the UE radio capability of ProSe that the UE supports.

Furthermore, the UE may obtain the E-UTRAN capability of ProSe of a cell by a system information broadcasted by the cell. The E-UTRAN capability of ProSe includes, but is not limited to, whether or not E-UTRAN capability of ProSe discovery is supported, and whether or not E-UTRAN capability of ProSe communication is supported. The E-UTRAN indicates the E-UTRAN capability of ProSe to the UE in a system information of a cell supporting the ProSe.

With respect to the ProSe capability that both the network and the UE support, the UE may activate the capability and initiate a request to the network so as to discover a UE in the proximity, or be discovered by a UE in the proximity, or initiate a communication with a UE in the proximity.

Figure 7:
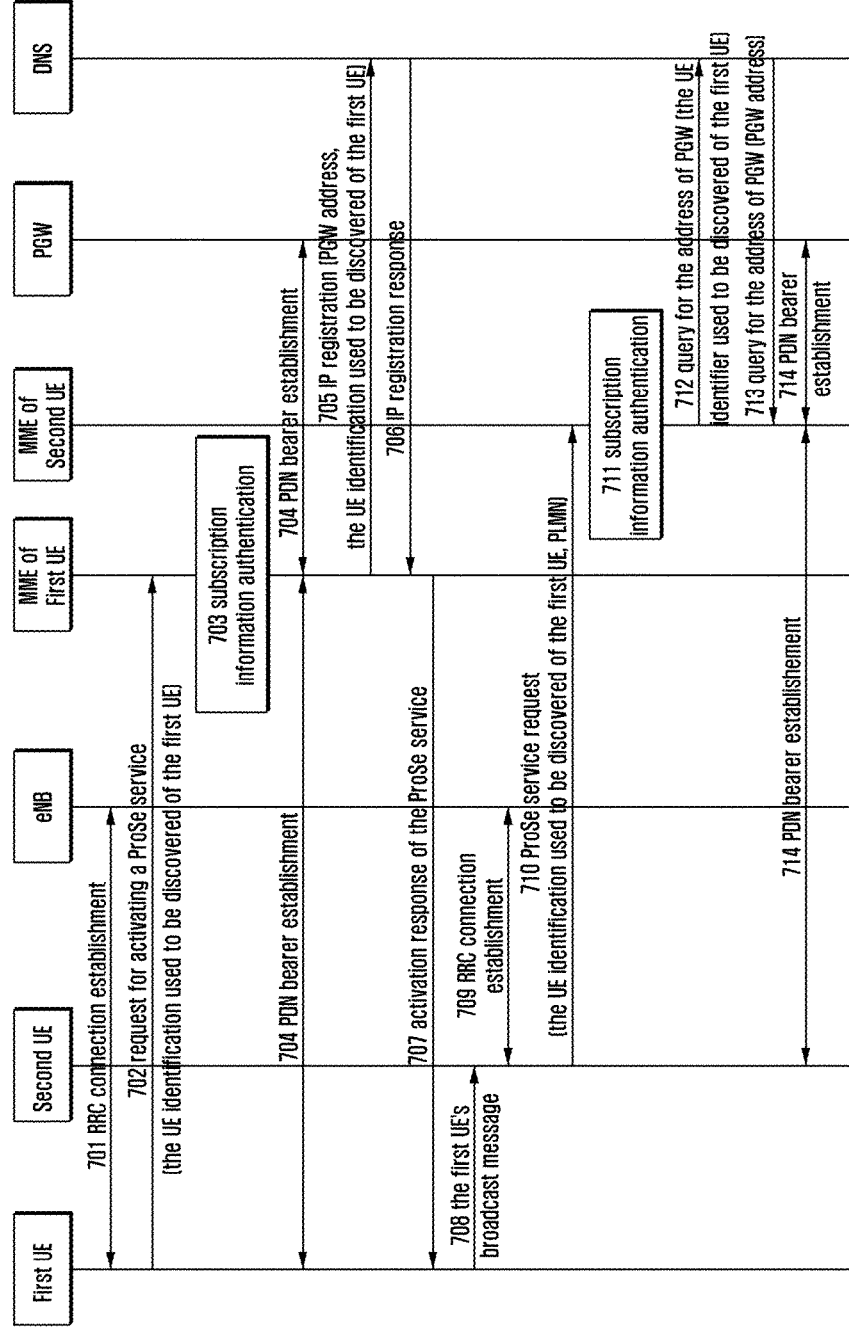
FIG. 7 is a schematic diagram of an embodiment of Method 1 for establishing a device to device PDN bearer between the UEs in this application.

FIG. 7 is a schematic diagram of an embodiment of Method 1 for establishing a device to device PDN bearer between the UEs in this application, the method including the following steps:

Step 701: a first UE establishes a RRC connection with a network.

Step 702: the first UE sends a request for activating a ProSe service to the MME of the first UE, and the request carries the UE identification used to be discovered of the first UE, and the UE identification used to be discovered may uniquely identify the first UE.

Step 703: the MME of the first UE authenticates the request for activating the ProSe service of the first UE according to the first UE's subscription information for the ProSe.

Step 704: with respect to the request for activating the ProSe service the authentication of which is passed, the MME of the first UE selects a PGW nearby to establish a PDN connection for the first UE, and the PGW is an IP address which the first UE allocates for the ProSe service.

Step 705: the MME of the first UE registers in a DNS the first UE's serving PGW of ProSe service, IP address, UE identification used to be discovered.

Step 706: the DNS returns to the MME of the first UE a registration response.

Step 707: the MME of the first UE returns to the first UE a ProSe service activation response.

Step 708: a second UE discovers the UE identification used to be discovered of the first UE.

Step 709: the second UE establishes a RRC connection with the network.

Step 710: the second UE sends a request for activating the ProSe service to the MME of the second UE, requesting the establishment of a one-to-one ProSe communication with the first UE, and the request carries the UE identification used to be discovered of the first UE which may uniquely identify the first UE and include the PLMN supporting the ProSe service.

Step 711: the MME of the second UE authenticates the request for activating the ProSe service of the second UE according to the second UE's subscription information for the ProSe.

Step 712: with respect to the request for activating the ProSe service whose authentication is passed, the MME of the second UE issues a query for the address of the first UE's serving PGW in the ProSe service to the DNS request according to the UE identification used to be discovered of the first UE.

Step 713: the DNS returns to the MME of the second UE the address of the first UE's serving PGW in the ProSe service.

Step 714: the MME of the second UE selects the first UE's serving PGW in the ProSe service for the second UE to establish a PDN connection.

Figure 8A:
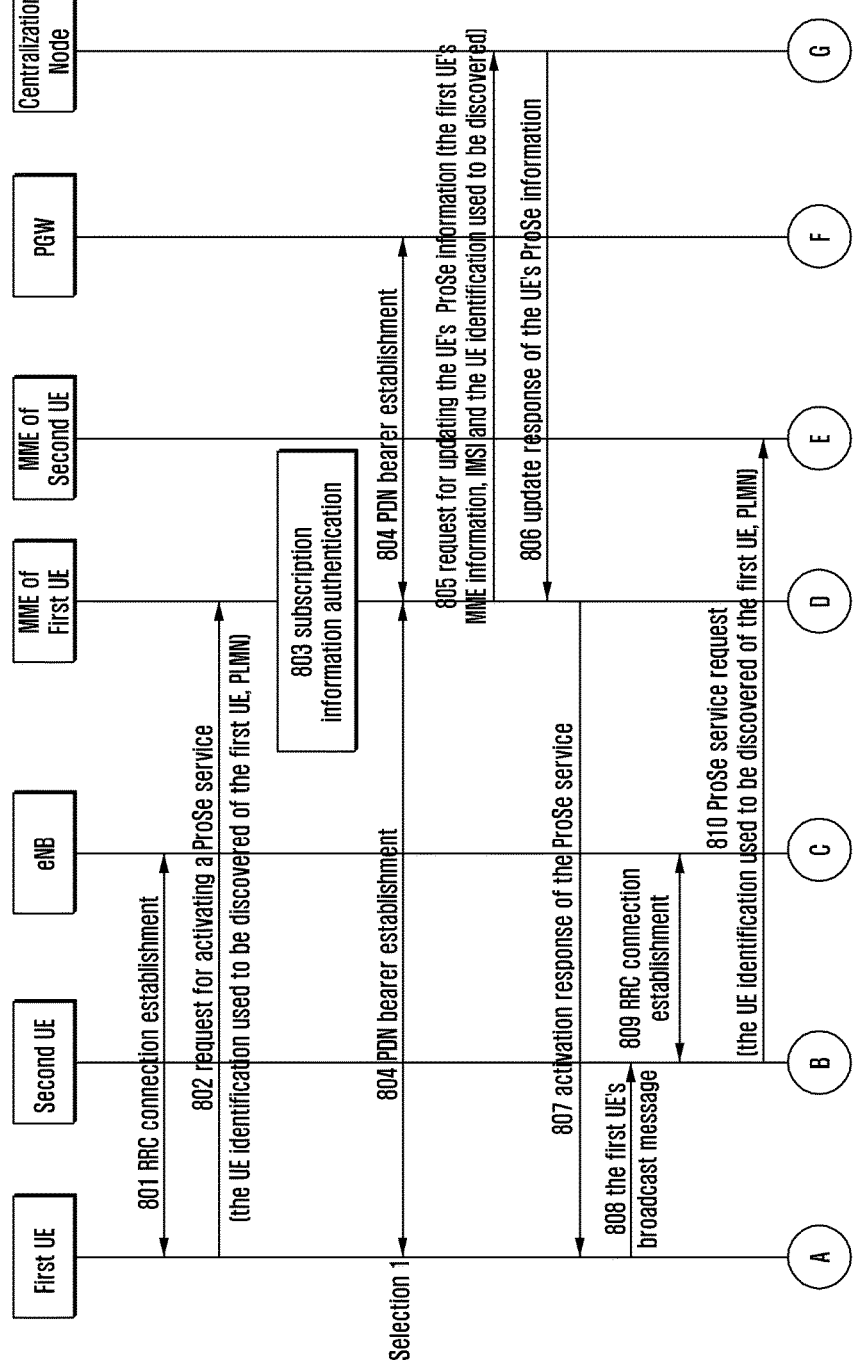

FIGS. 8a and 8b are schematic diagrams of Embodiment 1 of Method 2 for establishing a device to device PDN bearer between the UEs in this application, the method including the following steps:

Step 801: a first UE establishes a RRC connection with a network.

Step 802: The first UE sends a request for activating a ProSe service to the MME of the first UE, and the request carries the UE identification used to be discovered of the first UE which may uniquely identify the first UE.

Step 803: the MME of the first UE authenticates the request for activating the ProSe service of the first UE according to the first UE's subscription information for the ProSe. With respect to the request for activating the ProSe service whose authentication is passed, the MME of the first UE may immediately or upon receiving the ProSe service request sent by the MME of another UE, select a PGW nearby for the first UE to establish a PDN connection, and the PGW is an IP address which the first UE allocates for the ProSe service, which corresponds to Steps 804 and 815 respectively.

Step 804: the MME of the first UE selects a PGW nearby for the first UE to establish a PDN connection, and the PGW is the IP address which the first UE allocates for the ProSe service.

Step 805: the MME of the first UE sends a request for updating the ProSe's information of the UE to a centralization node, and stores in the centralization node the IMSI information, MME information and the UE identification to be discovered of the first UE. The MME information is the identification (GUMMEI) and the address of the MME.

The centralization node may be an HSS, a certain MME or a separate centralization node of the ProSe.

The target MME updates the new MME information to the centralization node when the first UE completes the handover between the MMEs.

Step 806: the centralization node returns to the MME of the first UE a update response of the UE's ProSe information.

Steps 807-811 are identical to Steps 707-711, and so a description thereof will not be repeated.

Step 812: with respect to the request for activating the ProSe service whose authentication is passed, the MME of the second UE issues to the centralization node a query for the MME information of the first UE according to the UE identification used to be discovered of the first UE.

Step 813: the centralization node returns to the MME of the second UE the MME information and IMSI information of the first UE.

Step 814: the MME of the second UE sends a ProSe service request to the MME of the first UE and designates the IMSI of the first UE.

Step 815: the MME of the first UE selects a PGW nearby for the first UE to establish a PDN connection, and the PGW is the IP address which the first UE allocates for the ProSe service.

Step 816: the MME of first UE returns to the MME of the second UE a ProSe service response, and carries the address of the first UE's serving PGW of the ProSe service.

Step 817: the MME of the second UE selects the first UE's serving PGW of the ProSe service for the second UE to establish a PDN connection.

Figure 9B:
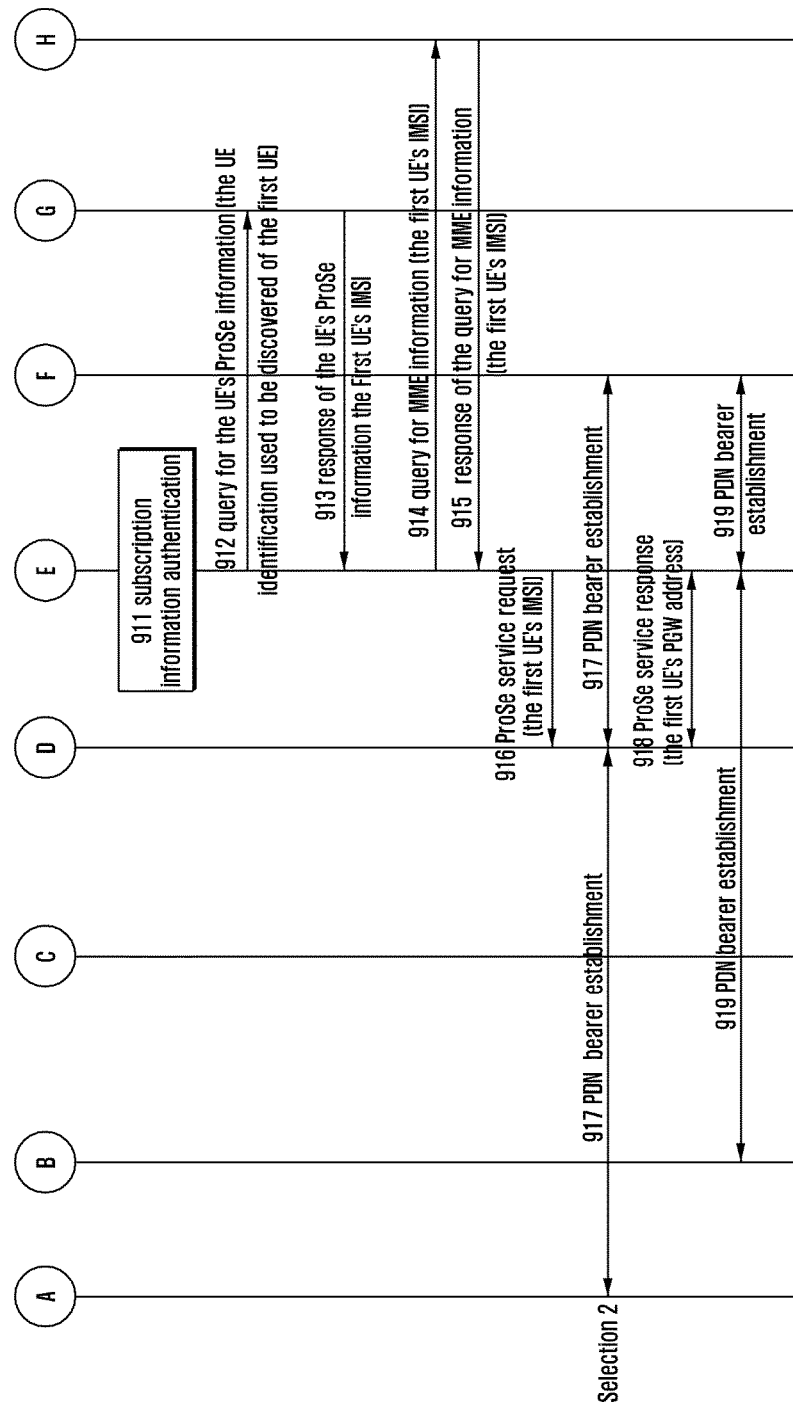

FIGS. 9a and 9b are schematic diagrams of Embodiment 2 of Method 2 for establishing a device to device PDN bearer between the UEs in this application, the method including the following steps:

Steps 901-904 are identical to Steps 801-804, and so a description thereof will not be repeated.

Step 905: the MME of the first UE sends a request for updating the ProSe information of the UE to the centralization node, and stores the IMSI information and the UE identification used to be discovered of the first UE in the centralization node.

The centralization node may be an HSS, a certain MME or a separate centralization node of the ProSe.

Step 906: the centralization node returns to the MME of the first UE an update response of the UE's ProSe information.

Steps 907-911 are identical to Steps 807-811, and so a description thereof will not be repeated.

Step 912: with respect to the request for activating the communication service whose authentication is passed, the MME of the second UE issues a query for the IMSI information of the first UE to the centralization node according to the UE identification used to be discovered of the first UE.

Step 913: the centralization node returns the IMSI information of the first UE to the MME of the second UE.

Step 914: the MME of the second UE issues a query for the MME information of the first UE to an HSS based on the IMSI information of the first UE.

Step 915: the HSS returns the MME information of the first UE to the MME of the second UE.

Steps 916-919 are identical to Steps 814-817, and so a description thereof will not be repeated.

Figure 10A:
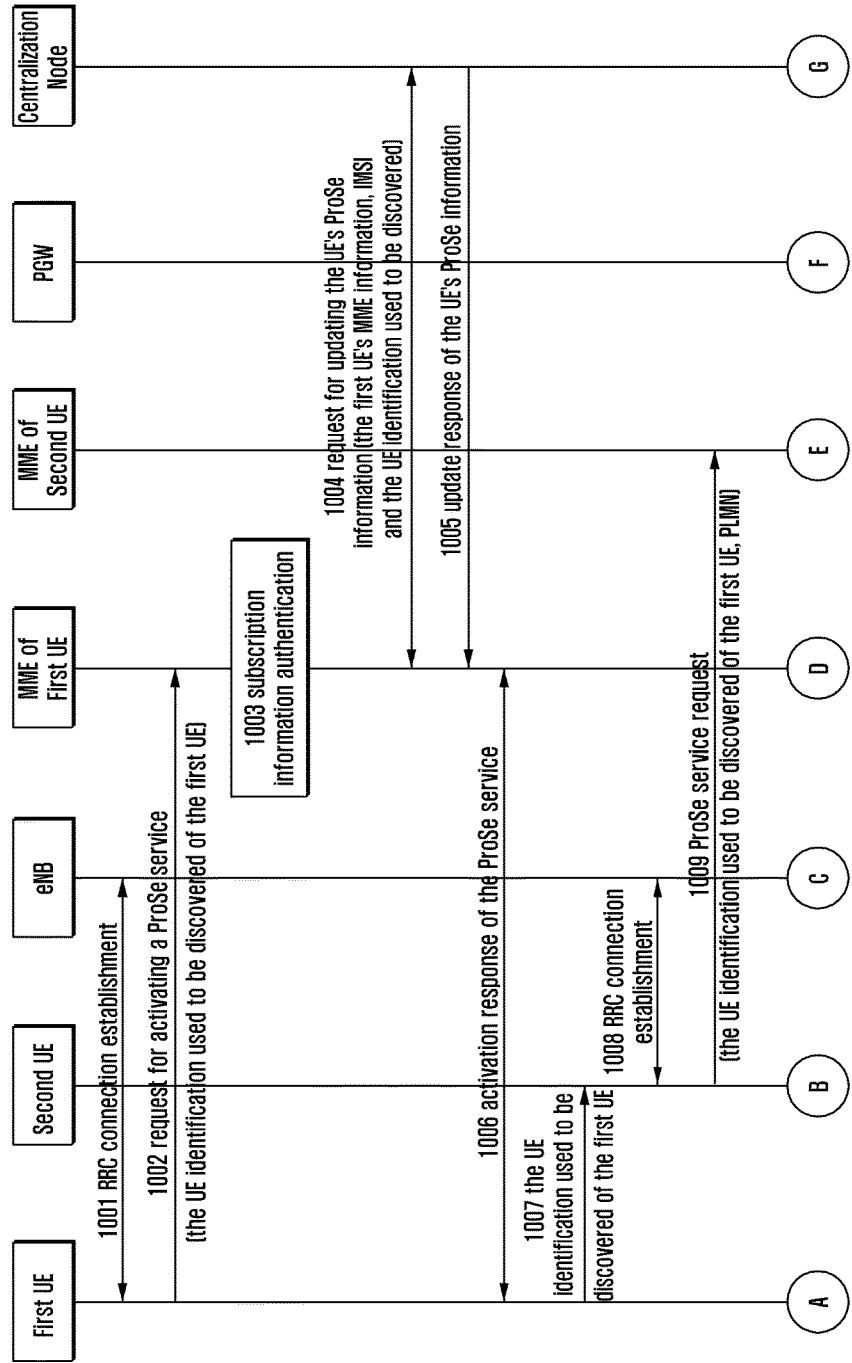
FIGS. 10a and 10b are schematic diagrams of an embodiment of Method 3 for establishing a device to device PDN bearer between the UEs in this application.
Figure 10B:
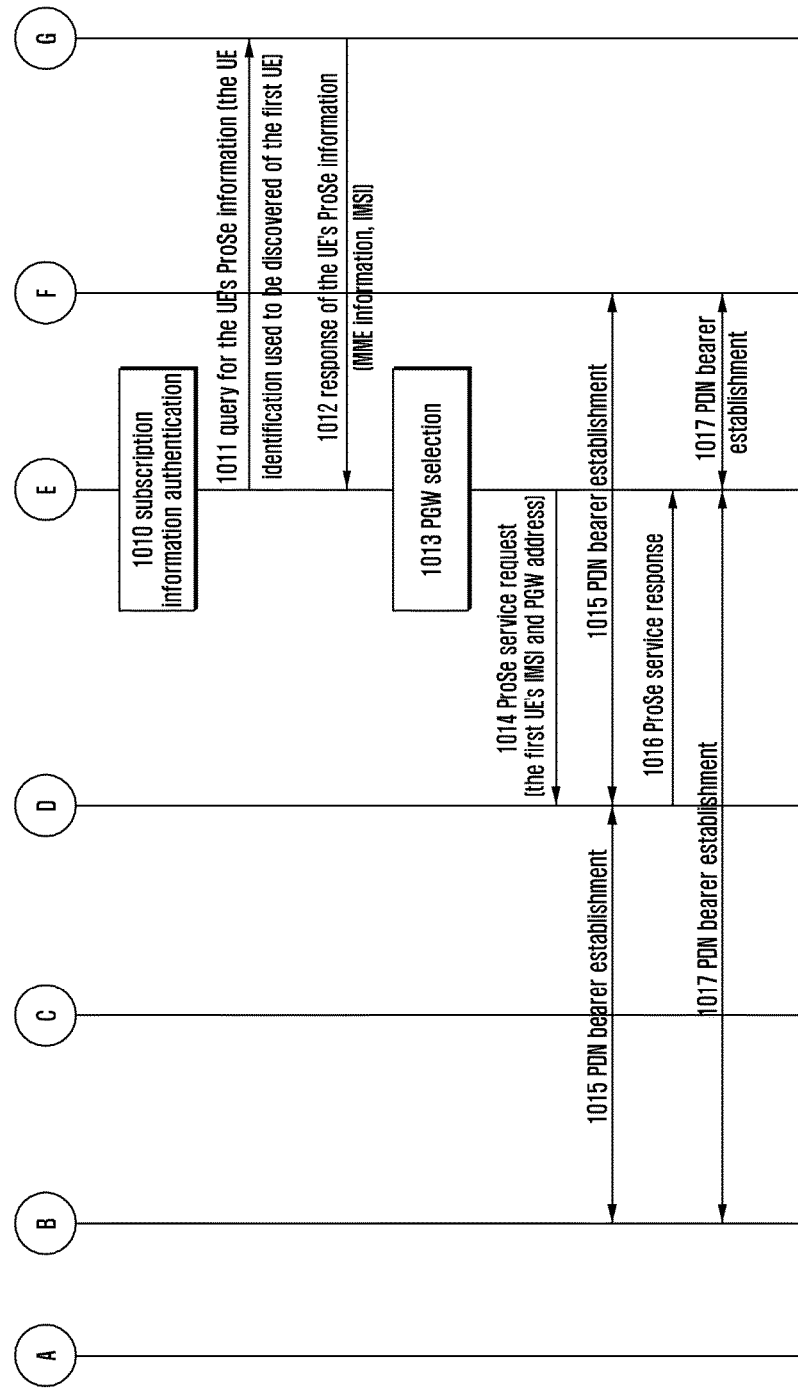
Figure 11:
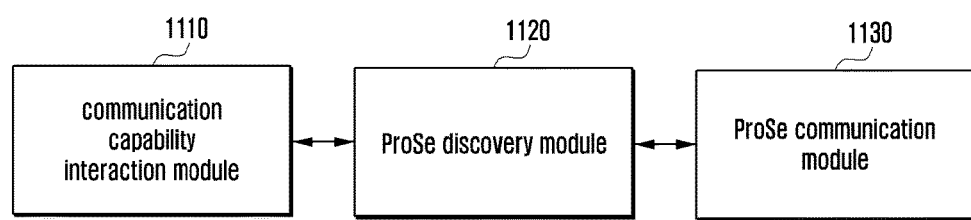
FIG. 11 is a schematic diagram of a composition structure of preferred user equipment in this application.

FIGS. 10a and 10b are schematic diagrams of an embodiment of Method 3 for establishing a device to device PDN bearer between the UEs in this application, the method including the following steps:

Steps 1001-1003 are identical to Steps 801-803, and so a description thereof will not be repeated.

Steps 1004-1012 are identical to Steps 805-813, and so a description thereof will not be repeated.

Step 1013: the MME of the second UE selects a PGW nearby for the second UE.

Step 1014: the MME of the second UE sends a ProSe service request to the MME of the first UE and designates the IMSI of the first UE and the address of the PGW of the ProSe service which is namely the nearby PGW that the MME of the second UE selects for the second UE in Step 1013.

Step 1015: the MME of the first UE selects for the first UE the PGW of the ProSe service that is selected for the second UE to establish a PDN connection, and the PGW is the IP address which the first UE allocates for the ProSe service.

Step 1016: the MME of the first UE returns to the MME of the second UE a ProSe service response.

Step 1017: the MME of the second UE establishes a PDN connection to the PGW's address of the designated ProSe service for the second UE, and the PGW is the IP address which the second UE allocates for the ProSe service.

Corresponding to the above described method, the present application also discloses a user equipment as shown in FIG.

11, the user equipment including a communication capability interaction module 1110, a ProSe discovery module 1120 and a ProSe communication module 1130, wherein:

The communication capability interaction 1110 module is used for acquiring a ProSe capability of a network, and sends its capability of ProSe to the network.

The ProSe discovery module 1120 is used for discovering another user equipment according to a UE identification used to be discovered of said another user equipment.

The ProSe communication module 1130 is used for initiating an ProSe service request to the network, the request carrying the UE identification used to be discovered of said another user device, when authentication of the request is passed based on subscription information, this user equipment and said another user equipment establish their device to device PDN bearer between UEs based on locally-routed.

The method provided by the present application is applicable for solving related problems about capability interactions between the UE and the network in the ProSe, the authentication of the subscription information and the one-to-one communication service request and bearer establishment based on locally-routed. The present application is the basis of achieving the ProSe, thus meeting service demands of public safety communication and implementing network resource optimization configuration.

The above-described is only a preferred embodiment of the present application, and is not intended to limit the present application, and any modification, equivalent substitution, improvement and the like that are made within the spirit and principle of this application should be included within the protection scope of the present application.

The invention claimed is:

1. A method for a proximity service (ProSe) by a network entity, the method comprising:
    receiving, from a user equipment (UE), an attach request message including UE capability information for a ProSe service;
    receiving, from the UE, a service request message for the ProSe service, the service request message including an identification of the UE;
    obtaining, from a server, an address of a packet data network gateway (PGW) based on the identification of the UE which is a UE to be discovered by another UE, wherein a packet data network (PDN) bearer of the other UE is pre-established based on the PGW;
    selecting the PGW for establishing a PDN bearer of the UE based on the obtained address of the PGW; and
    transmitting, to a base station, a context setup request message including information indicating that the UE is authorized to use the ProSe service associated with a registered public land mobile network (PLMN) based on subscription information of the UE,
    wherein the subscription information of the UE is received from a home subscriber server (HSS) and includes first subscription information for a ProSe direct discovery, second subscription information for a ProSe direct communication and third subscription information for a ProSe UE-to-network relay, and
    wherein authorization information for the ProSe service is obtained by the UE, the authorization information for the ProSe service including a discovery range.

2. The method of claim 1, wherein the UE capability information for the ProSe service indicates whether the UE is capable of supporting at least one of the ProSe direct discovery, the ProSe direct communication, and the ProSe UE-to-network relay.

3. The method of claim 1, wherein information for the ProSe direct communication is provisioned to the UE if the UE is served by an evolved universal terrestrial radio access network (E-UTRAN).

4. A network entity for a proximity service (ProSe), the network entity comprising:
    a transceiver; and
    a controller coupled with the transceiver and configured to control:
        receiving, from a user equipment (UE), an attach request message including UE capability information for a ProSe service,
        receiving, from the UE, a service request message for the ProSe service, the service request message including an identification of the UE,
        obtaining, from a server, an address of a packet data network gateway (PGW) based on the identification of the UE which is a UE to be discovered by another UE, wherein a packet data network (PDN) bearer of the other UE is pre-established based on the PGW,
        selecting the PGW for establishing a PDN bearer of the UE based on the obtained address of the PGW, and
        transmitting, to a base station, a context setup request message including information indicating that the UE is authorized to use the ProSe service associated with a registered public land mobile network (PLMN) based on subscription information of the UE,
    wherein the subscription information of the UE is received from a home subscriber server (HSS) and includes first subscription information for a ProSe direct discovery, second subscription information for a ProSe direct communication and third subscription information for a ProSe UE-to-network relay, and
    wherein authorization information for the ProSe service is obtained by the UE, the authorization information for the ProSe service including a discovery range.

5. The network entity of claim 4, wherein the UE capability information for the ProSe service indicates whether the UE is capable of supporting at least one of the ProSe direct discovery, the ProSe direct communication, and the ProSe UE-to-network relay.

6. The network entity of claim 4, wherein information for the ProSe direct communication is provisioned to the UE if the UE is served by an evolved universal terrestrial radio access network (E-UTRAN).

* * * * *